United States Patent
Galesloot

(10) Patent No.: US 6,634,544 B1
(45) Date of Patent: Oct. 21, 2003

(54) METHOD AND ARRANGEMENT FOR IMPROVING QUALITY IN FUSION WELDING OPERATIONS

(75) Inventor: Fred Galesloot, Lelystad (NL)

(73) Assignee: AGA Aktiebolag, Lidingo (SE)

( * ) Notice: Subject to any disclaimer, the term of this patent is extended or adjusted under 35 U.S.C. 154(b) by 0 days.

(21) Appl. No.: 09/700,152

(22) PCT Filed: May 11, 1999

(86) PCT No.: PCT/SE99/00793

§ 371 (c)(1),
(2), (4) Date: Feb. 12, 2001

(87) PCT Pub. No.: WO99/59767

PCT Pub. Date: Nov. 25, 1999

(30) Foreign Application Priority Data

May 15, 1998 (SE) ................................. 9801730

(51) Int. Cl.[7] ............................... B23K 35/38
(52) U.S. Cl. .............................. 228/219; 228/42; 219/74
(58) Field of Search ............... 228/218, 219, 228/220, 42; 219/74, 75

(56) References Cited

U.S. PATENT DOCUMENTS 1,325,116 A * 12/1919 Sebille .................... 219/74
2,504,867 A * 4/1950 Muller .................... 219/74
2,788,429 A * 4/1957 Turner et al. ............ 219/74
3,089,944 A * 5/1963 Matthews ................. 219/74
4,634,833 A * 1/1987 Chemnitz ............. 219/137 R

FOREIGN PATENT DOCUMENTS

| DE | 2135 545 | 1/1973 |
| EP | 0 074 106 | 3/1983 |

* cited by examiner

Primary Examiner—M. Alexandra Elve
Assistant Examiner—Len Tran
(74) Attorney, Agent, or Firm—Pearne & Gordon LLP

(57) ABSTRACT

Arrangement for improving quality in fusion welding operations where protective gas is supplied to the welding point via a hose line. The arrangement comprises means (5, 6), such as a bypass line connected parallel to the solenoid valve (4) which is usually connected into the protective-gas hose (3), in order make a small flush-gas flow pass through the protective-gas hose (3) or a considerable part of its length, when the normal protective-gas flow is shut off. In this way, the quantity of impurities brought along by the protective-gas flow from the inside of the protective-gas hose (3) and supplied to the pool is reduced.

28 Claims, 1 Drawing Sheet

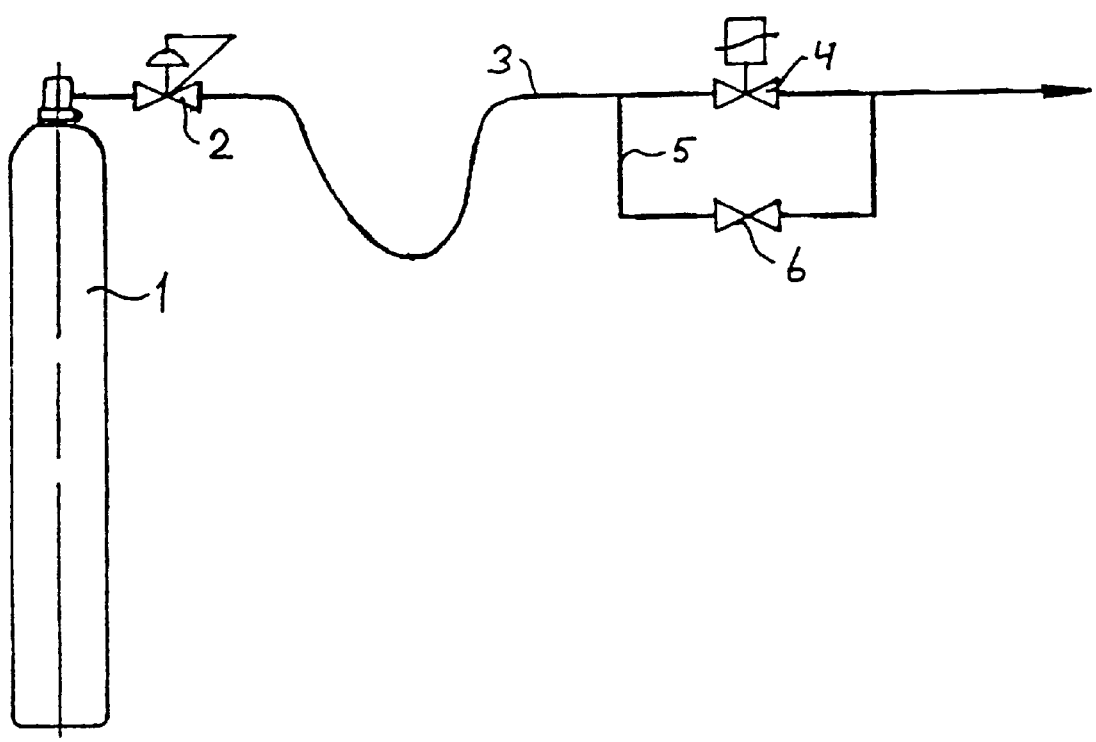

METHOD AND ARRANGEMENT FOR IMPROVING QUALITY IN FUSION WELDING OPERATIONS

The present invention relates to a method for improving quality in fusion welding operations where protective gas is supplied to the welding point via a hose line.

The invention also relates to an arrangement for use in implementing the method.

In the fusion welding of aluminium, a number of material-specific quality problems arise, which lead to high repair costs. The major and most extensive problem arises as a consequence of the presence of porosity in the weld joint. The main cause of the porosity is that hydrogen, $H_2$, is readily dissolved in liquid aluminium. The dissolved hydrogen accumulates and forms gas bubbles in the solidified metal, which give rise to a strength-reducing porosity in the weld joint. It is therefore desirable to achieve as little porosity as possible in the weld metal.

The most common sources of the hydrogen are moisture, dirt, oil and fat which come into contact with the fused metal during welding. The welding should therefore take place under clean and dry conditions. In spite of the fact that attempts have been made to achieve conditions which are as dry as possible, it has not been possible to overcome porosity in the weld joint caused by moisture.

The present invention is based on the knowledge that a contributory cause of such porosity resulting from moisture may be condensate which for various reasons is formed on the inside of protective-gas hoses and welding guns. This moisture is then conveyed forward by the protective gas to the pool at the welding point. Tests performed have also confirmed that this is the case.

In other welding operations, such as welding stainless steel, titanium, high-alloy stainless steel, nickel-based steel and magnesium, problems associated with inter alia oxidation which is difficult to explain arise. With the knowledge that has been gained in the development of the present invention, it has emerged that these problems also may be due to impurities which originate from the inside of the protective-gas hose and are supplied to the pool by the gas flow. Such impurities may consist of oxygen and also moisture which diffuse in through the walls of the hoses used for the protective-gas flow. Other impurities present in the hoses can also influence the weld quality.

The main object of the present invention is to produce a technique which considerably reduces the quality impairments which occur in fusion welding using protective gas as a consequence of impurities brought along by the protective gas from the inside of the protective-gas hoses.

According to the present invention, this is achieved by virtue of the fact that a small flush-gas flow is made to flow through the protective-gas hoses even when the normal protective-gas flow is shut off. In this way, moisture is prevented from condensing on the inside of the hose, and other impurities are prevented from accumulating there when the protective-gas flow is shut off.

The particularly characteristic features of a method and an arrangement according to the present invention emerge from independent claims. Further features of the invention are indicated in the associated subclaims.

The invention will be described in greater detail below with reference to the embodiment of an arrangement according to the invention, which is shown diagrammatically in the appended drawings.

In FIG. 1, 1 designates a gas bottle containing a gas or gas mixture which is to be used as a protective gas in a welding operation. The gas may be, for example, an inert gas or gas mixture or comprise nitrogen. In the case of aluminium welding in particular, it is important that the gas or gas mixture has a low moisture content.

Reference number 2 designates a pressure-reducing valve which is connected via a protective-gas hose 3 to a solenoid valve 4 which is usually controlled by a welding gun connected to the valve. The solenoid valve is usually combined with a wire-feeding unit.

At the start of a welding operation, the welding gun is actuated, the solenoid valve 4 then being opened so that protective gas can flow forward to the pool. This means that protective gas flows only during and in connection with the welding itself. When no welding is taking place, the protective-gas flow is therefore shut off. The result of this is that, depending on the ambient and temperature conditions prevailing where the equipment is stored between welding operations, it will be possible for condensation to take place to a greater or lesser extent on the inside of the protective-gas hose and in the welding gun. Moisture and gases, such as oxygen, may also diffuse in through the hose wall and accumulate on its inside. When welding is recommenced, moisture and other impurities on the inside of the protective-gas hose will then be conveyed to the pool by the protective-gas flow. As mentioned above, moisture constitutes a source of porosity in the weld joint, in particular in the case of aluminium welding, and oxygen gives rise to undesirable oxidation of the weld metal.

In the embodiment shown, a bypass line 5 with a valve arrangement 6 has been connected in so as to be parallel to the solenoid valve 4. The valve 6 can be adjusted so that a small flow of protective gas always passes through the bypass line 5, which means that a continuous flow through the protective-gas hose 3 and the welding gun is obtained, even when protective gas is not flowing through the solenoid valve 4. This flush-gas flow prevents moisture or other impurities accumulating on the inner surface of the protective-gas hose 3 during the time when the equipment is inactive. Such impurities would otherwise be supplied to the pool in the next welding operation.

The valve arrangement 6 may consist of a fixed throttle or a regulating valve which, if so desired, can be controlled depending on the opening and closing of the solenoid valve 4. The flush-gas flow may be of the order of, for example, 1 l/min and flow through both the protective-gas hose and the welding gun. When what is known as root protection is used for the weld, a flush-gas flow can also flow through the associated hose line.

Instead of using a bypass line 5, the solenoid valve 4 can itself be made with a passage for a flush-gas flow which flows even when the main passage of the solenoid valve is shut.

The principle according to the invention can be used in all types of fusion welding operations irrespective of the material combinations to be welded.

The flush-gas flow suitably consists of the same gas or gas mixture as the protective-gas flow. However, it is of course possible to use a separate source of flush gas, if desired. The flush gas should preferably be of the inert type but may also consist of nitrogen for certain applications. In the case of aluminium welding in particular, it is important that the gas or gas mixture has a low moisture content. In other applications, such as, for example, welding stainless steel and the like, it may be a requirement for the flush gas to have a low oxygen content.

The gas may be ready-mixed or be mixed by means of a mixer. It can be kept in a pressure container, such as a gas bottle, or in liquid form in a pressure tank.

What is claimed is:

1. Method of improving quality in fusion welding operations where protective gas is supplied to the welding point via a protective-gas hose line, comprising the step of continuously passing a small flush-gas flow through the protective-gas hose or a considerable part of its length when a normal protective-gas flow through the protective-gas hose is shut off, whereby the quantity of impurities brought along by the protective-gas flow from the inside of the protective-gas hose and supplied to the welding point is reduced.

2. Method according to claim 1, characterized in that the protective-gas flow also passes though a welding gun connected to the protective-gas hose.

3. Method according to claim 1, characterized in that the same gas or gas mixture is used for said flush-gas flow as for the protective-gas flow.

4. Method according to claim 1, characterized in that an inert gas or gas mixture and/or nitrogen is/are used for the flush-gas flow.

5. Method according to any one claim 1, implemented in the fusion welding of aluminium, characterized in that a gas or gas mixture with a low moisture content is used for the flush-gas flow.

6. Arrangement for improving quality in fusion welding operations where protective gas is supplied to the welding point via a hose line, characterized by means for causing a small flush-gas flow to pass through the protective-gas hose (3) or a considerable part of its length, when the normal protective-gas flow is shut off when a valve is shut, in order to reduce the quantity of impurities brought along by the protective-gas hose (3) and supplied to the pool, said means for causing a small flush-gas flow comprising a passage in said valve for flush-gas flow which flows even when the main passage of the valve is shut.

7. A welding equipment according to claim 6 comprising a solenoid valve (4) connected into the protective-gas hose (3), characterized in that it comprises a bypass line (5) which is connected in parallel to the solenoid valve (4) and has a regulating arrangement (6) for the flush-gas flow.

8. A welding equipment according to claim 7, characterized in that said regulating arrangement (6) comprises a regulating valve or throttle.

9. A welding equipment according to claim 7, characterized in that the flush-gas flow consists of the same gas or gas mixture as the protective-gas flow.

10. A welding equipment according to any one of claim 6, characterized in that it comprises a separate source of flush gas.

11. Method according to claim 2, characterized in that the same gas or gas mixture is used for said flush-gas flow as for the protective-gas flow.

12. Method according to claim 2, characterized in that an inert gas or gas mixture and/or nitrogen is/are used for the flush-gas flow.

13. Method according to claim 3, characterized in that an inert gas or gas mixture and/or nitrogen is/are used for the flush-gas flow.

14. Method according to claim 11, characterized in that an inert gas or gas mixture and/or nitrogen is/are used for the flush-gas flow.

15. Method according to claim 2 implemented in the fusion welding of aluminum, characterized in that a gas or gas mixture with a low moisture content is used for the flush-gas flow.

16. Method according to claim 3 implemented in the fusion welding of aluminum, characterized in that a gas or gas mixture with a low moisture content is used for the flush-gas flow.

17. Method according to claim 11 implemented in the fusion welding of aluminum characterized in that a gas or gas mixture with a low moisture content is used for the flush-gas flow.

18. Method according to claim 4 implemented in the fusion welding of aluminum, characterized in that a gas or gas mixture with a low moisture content is used for the flush-gas flow.

19. Method according to claim 12 implemented in the fusion welding of aluminum, characterized in that a gas or gas mixture with a low moisture content is used for the flush-gas flow.

20. Method according to claim 13 implemented in the fusion welding of aluminum, characterized in that a gas or gas mixture with a low moisture content is used for the flush-gas flow.

21. Method according to claim 14 implemented in the fusion welding of aluminum, characterized in that a gas or gas mixture with a low moisture content is used for the flush-gas flow.

22. A welding equipment according to claim 7, characterized in that the flush-gas flow consists of the same gas or gas mixture as the protective-gas flow.

23. A welding equipment according to claim 8, characterized in that the flush-gas flow consists of the same gas or gas mixture as the protective-gas flow.

24. A welding equipment according to claim 7, characterized in that it comprises a separate source of flush gas.

25. A welding equipment according to claim 8, characterized in that it comprises a separate source of flush gas.

26. A welding equipment according to claim 9, characterized in that it comprises a separate source of flush gas.

27. A welding equipment according to claim 22, characterized in that it comprises a separate source of flush gas.

28. A welding equipment according to claim 23, characterized in that it comprises a separate source of flush gas.

* * * * *

UNITED STATES PATENT AND TRADEMARK OFFICE
CERTIFICATE OF CORRECTION

PATENT NO. : 6,634,544 B1  Page 1 of 1
DATED : October 21, 2003
INVENTOR(S) : Fred Galesloot It is certified that error appears in the above-identified patent and that said Letters Patent is hereby corrected as shown below:

Column 3,
Line 20, please delete "any one claim 1", and insert therefor -- claim 1 --.
Line 43, please delete "according to claim 7", and insert therefor -- according to claim 6 --.
Line 46, please delete "any one of claim 6", and insert therefor -- claim 6 --.

Column 4,
Line 16, please delete "aluminum characterized", and insert therefor -- aluminum, characterized --.

Signed and Sealed this

Eleventh Day of May, 2004

JON W. DUDAS
*Acting Director of the United States Patent and Trademark Office*